Feb. 24, 1942.                C. J. PENTHER                2,274,158
                          TIMING DEVICE AND METHOD
                    Filed April 13, 1940        2 Sheets-Sheet 1

INVENTOR
Carl Joseph Penther

Feb. 24, 1942. C. J. PENTHER 2,274,158
TIMING DEVICE AND METHOD
Filed April 13, 1940  2 Sheets-Sheet 2

INVENTOR
Carl Joseph Penther

Patented Feb. 24, 1942

2,274,158

UNITED STATES PATENT OFFICE 2,274,158

TIMING DEVICE AND METHOD

Carl Joseph Penther, Oakland, Calif.

Application April 13, 1940, Serial No. 329,540

11 Claims. (Cl. 88—14)

This invention relates to a device and to a method for measuring the time elapsing between recurrent positions of an object, such as a reciprocating mechanical element of a mechanism, which normally prevents the passage of light but transmits light during the short time intervals that the object is away from said recurrent position. More particularly, the invention is adapted to measure relatively short time intervals, such as the minute time intervals defined by the operation of a shutter of a photographic camera, i. e., to measure the "speed" of a shutter. The invention is not, however, limited to the testing of shutters or to the measurement of such short time intervals for, as will be apparent from the following specification, the method and device are adapted to measure the time intervals between recurrent positions of other mechanical elements having reciprocating or cyclic movements which can be interposed in the path of a beam of light to interrupt the beam in certain positions.

Various arrangements have been devised for testing or calibrating camera shutters. Among the most recent proposals are those employing an electrical system comprising a photo-electric cell and a condenser, wherein a beam of light is permitted to act upon the cell during the time that the camera shutter is open and the electric current flowing through the cell during this time is accumulated on the condenser. The quantity of the charge accumulated is then measured in some manner. Since this quantity is approximately proportional to the time interval that the beam of light acted upon the cell, an indication of the exposure time is obtained thereby.

Thus, according to the method of Long and Blair in The Photographic Journal, August, 1934, pp. 423 and 424, the charge on the condenser is transferred to a ballistic galvanometer. This method does not give an instantaneous reading of the exposure time, but involves a charge transferring operation after the cell has been exposed by the operation of the shutter.

According to the method proposed by Kelley in U. S. Patent No. 2,168,994, a light of any suitable intensity is permitted to act upon the photo-electric cell and the charge passing through the cell during the operation of the shutter is accumulated on the condenser. The condenser is then disconnected from the cell, the shutter is fixed in its fully open position to permit the full beam of light to act on the cell, and the resulting current is passed through an adjustable resistance element, which element is adjusted until the potential difference across the resistor is equal to the potential difference across the condenser. In this method the shutter speed is obtained only after the resistor has been adjusted. During this adjustment some of the charge leaks from the condenser, through various insulators and parts of the circuit, thereby necessitating several operations of the shutter for accurate results. While some of the time required for adjustment is eliminated by providing two cells, one for receiving the light during the operation of the shutter, and the other for receiving a steady beam of light, the adjusting step is not obviated thereby.

It is an object of my invention to provide a device and a method for determining accurately, simply, and directly the time interval during which a mechanical element which normally prevents the passage of light is disposed to transmit light. The mechanical element will most usually be of the type having a reciprocating or cyclic operation, such as a camera shutter, and the time measured is the time elapsed between instants that it occupies a recurrent position.

A further object of the invention is to provide a device and method which will yield an instantaneous and direct reading of the time interval or shutter speed, thereby eliminating the charge transferring operation and the adjusting operation required by the prior art methods after the operation of the shutter.

Another object of the invention is to provide a device and a method for determining the time elapsed between instants that a mechanical element, such as a camera shutter, occupies a recurrent position by adjusting the intensity of a beam of light to cause a photo-electric means to pass an electric current of a predetermined intensity, whereby a direct reading of the time is possible in the subsequent measuring step; causing the adjusted beam of light transmitted by the mechanical element to act upon the same photo-sensitive means, such as a phototube and translating the transmitted light energy to electrical energy substantially proportional to the luminous flux transmitted during the time that said element is away from said recurrent position; and measuring the magnitude of the electrical energy to yield a direct reading of the time. According to this invention the predetermined intensity of electric current with reference to which the intensity of the light beam is adjusted is so related to the characteristics of the electrical device used in the last step to measure the electrical energy that the scale of the measuring device may be graduated directly in units of time, whereby the device will indicate time directly when it operates to measure the electrical energy. In a series of tests, as when testing a camera for different apertures, the adjustment of the light intensity in this manner during each test causes the results of the several tests to be consistent.

Ancillary thereto, it is an object of the invention to provide a device and method whereby the intensity of the light can be rapidly and conveniently adjusted for the particular camera or for the particular setting of the aperture for which the camera is to be tested, whereby the necessity of providing a light of known intensity is obviated, and whereby the device can be readily applied to various mechanical elements and to cameras of different styles and sizes.

It is another object of this invention to provide a device and method of the type described which will indicate the average open time of the camera shutter. By average open time is meant the time interval in which the total amount of light (passed by the shutter in its normal operation) would pass if the shutter remained fixed at full opening. The relation of the average open time to the total time between the instant that the shutter begins to pass light and the instant that the shutter completely interrupts the light is explained in the aforesaid Kelley Patent No. 2,168,994, and need not be repeated herein, except to state that for most shutters, with a given "speed" of the shutter, the average open time becomes greater when the iris diaphragm or equivalent aperture device is set for a smaller opening. As is explained hereafter, since shutter speeds are not always uniform for all positions of the shutter, it may be desirable in certain cases to test the shutter speed at a particular zone or region along its path, instead of testing it for the light which it transmits to the entire frame of the picture. Thus, a mask may be provided which will permit only light from a particular zone of the picture frame to be transmitted by the shutter, whereby the shutter speed for this limited zone can be measured. The expression "average open time" as used in this specification and claims includes times determined for the entire picture frame as well as those made for such a limited zone.

A subsidiary object of the invention is to afford a means for measuring the average open time for various settings of the aperture; and to provide a system which will permit the average open time for various portions of the shutter plane or of various zones of the picture frame (in the plane of the light sensitive surface) to be measured.

Still another object of the invention is the provision of a device and method of the type described which will permit, if desirable, a plurality of ranges of time intervals or shutter speeds to be indicated by the indicating device associated with the condenser, whereby a greater spread of the various ranges is made possible, and accuracy of the measurement as well as the ease of reading are promoted.

Other objects of the invention will be apparent from a reading of this specification, taken together with the drawings forming a part thereof, wherein certain preferred embodiments of the invention are described and illustrated.

According to one embodiment, the device comprises a source of light adapted to direct a beam of light toward the mechanical device, such as the camera shutter the intensity of the beam being adjustable (by varying the brightness of the lamp, or its distance from the photo-electric cell, or by means of an iris diaphragm or the like); photo-sensitive means, preferably of the photo-emissive type, such as a phototube, adapted to receive the beam of light transmitted by the element, e. g., to receive light when the camera shutter is open and to translate the light into an electric current; a timing condenser connected to the photo-sensitive means so as to be charged by the flow of current through the photo-sensitive means and to accumulate the charge during the normal operation of the mechanical element; an electrical resistance element adapted to be connected in the photo-cell circuit, preferably by being shunted across the timing condenser to receive the said electric current during the adjustment step when the mechanical element is fixed in a position to transmit light continuously; means for disconnecting the resistance from the circuit; and a high resistance, sensitive voltmeter, such as an electrostatic or vacuum tube voltmeter, for measuring the potential across the electrodes of the condenser, and when the resistance element is connected in the circuit, the potential across the resistance element. The voltmeter is provided with an indicating means, such as a dial with a pointer movable in response to potentials measured by the voltmeter, preferably graduated directly in time intervals or in shutter speeds, or in deviations from a standard shutter speed to indicate the measured time interval when the potential across the electrodes of the condenser is measured. The indicating means is further provided with an index denoting a predetermined unit deflection, whereby the intensity of the light can be adjusted to bring the potential across the resistance to a predetermined value when the resistance is connected and the mechanical element is disposed to transmit light continuously.

The method of the invention, according to one embodiment, and as applied to testing camera shutters, comprises, briefly, the step of (a) adjusting the intensity of the light with the camera shutter open until the voltmeter indicates a unit deflection, indicated by the index with the electrical resistance connected in the circuit of the photo-sensitive means and (b) the step of testing the camera shutter or other device by operating the shutter so as to cause the beam of light to act upon the photo-sensitive means for a short time with the electrical resistance disconnected from the circuit. The time interval, the shutter speed, or the deviation of the shutter speed from standard may then be read directly on the voltmeter dial. It will be noted that the timing condenser need not be permanently connected to the photo-sensitive means, it being only necessary that it be connected during the testing step (b).

I have found that accurate readings may be taken over a range from about 0.0005 second to over 2.0 seconds with the device described in this specification. The invention may, of course, also be applied to the measurement of other ranges.

The invention will be understood more completely from the following detailed description, taken in conjunction with the drawings, in which.

Figure 1:
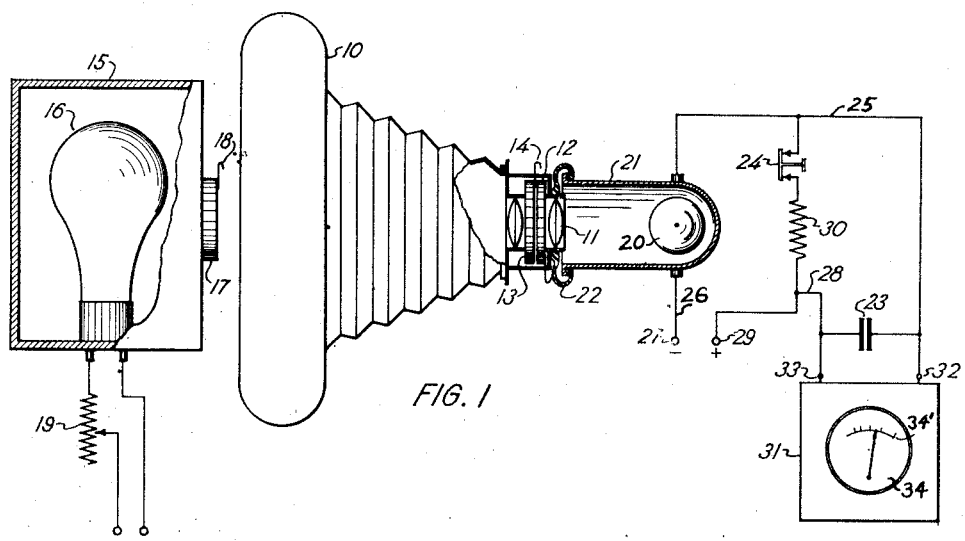
Figure 1 is an elevation view, partly in section, showing the timing device applied to a photographic camera having a between the lens type shutter, and illustrating the principal parts of the circuit.

Referring to Figure 1, 10 is a photographic camera provided with a lens 11, an iris diaphragm 12, and a shutter 13, which may be set for different speeds by the lever 14. The back of the camera is removed, and a light box 15 is mounted in rear of the camera. The box 15 contains an electric lamp 16 and has an optical unit 17, which may include a lens and an iris diaphragm regulated by a lever 18; the lens and/or the diaphragm may, in certain cases, be omitted. The power to the lamp is regulated by means of a rheostat 19. The intensity of the light passing from the box 15 toward the camera can be adjusted by means of the rheostat 19 or by means of the iris diaphragm, or by varying the distance of the box from the camera, or by a combination of two or more of these expedients.

Either direct or alternating current may be used to heat the lamp filament, direct current being preferred, but alternating current being usually more readily available. When alternating current is used certain precautions are desirable when measuring time intervals which are small in comparison to the period of the alternating current, particularly when less than about 2 cycles of alternation are completed during the measured time interval. This would apply to time intervals shorter than about 1/30 of a second when 60 cycle current is used. In such situations it is desirable to prevent appreciable variations in the intensity of illumination during the testing step by using a lamp having a relatively heavy filament. It was, however, found that reasonably accurate results can be obtained even with the usual tungsten filament, 110 volt lamps operated with 60 cycle current when measuring time intervals shorter than 1/500 second because the intensity of the light emitted under such conditions does not usually vary more than about 2 to 4 per cent from the mean value, the alternating current having the effect of causing only a slight ripple. It is, of course, not necessary to use an electric lamp in the light box, and any other suitable source of light may be employed.

A phototube 20, provided with a tubular light shield 21, is mounted in front of the camera, preferably with the end of the shield in close proximity to or in contact with the face of the camera, so as to exclude extraneous light from the phototube 20. A ring of soft rubber 22 may be secured to the mouth of the shield 21 to facilitate contact with the camera. It is desirable to locate the shield 21 coaxially with the optical axis of the lens 11 so that the beam of light emitted by the light box 15 and acting upon the phototube is centered with respect to the lens. When it is desired to measure the average open time, the light should be evenly distributed over the field of the shutter plane through which light will pass when the shutter is operated. This can be effected by designing the optical element 17 to emit a diffused light, or, in certain cases, by omitting it entirely. If, on the other hand, the time that the shutter exposes a particular part of the field is desired, or it is desired to obtain a value which approaches the total shutter time, the optical element 17 should be designed to emit a narrow beam of light focussed at the shutter plane, and passing through the particular point to be measured, such as the center of the shutter. This method is particularly adapted to, but not restricted to, focal plane shutters.

Figure 2:
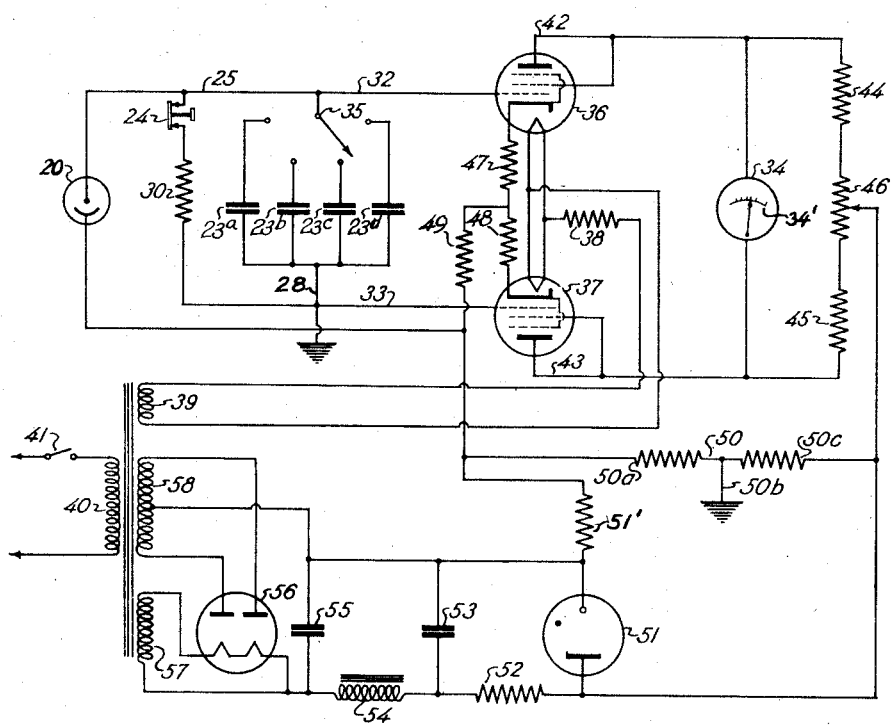
Figure 2 is a wiring diagram showing the preferred circuit which may be used in connection with the optical and mechanical elements shown in Figure 1 or with those shown in Figures 4 and 5.

The anode of the phototube 20 is connected to one electrode of a timing condenser 23 and to one terminal of a normally closed push button switch 24 by means of lead 25. The cathode of the phototube is connected to a source of stabilized direct current supply via lead 26 and terminal 27. The other electrode of the condenser 23 is connected to a common ground return 28, which is also connected to the positive terminal 29 of the direct current supply. A resistance element 30 is connected between the second terminal of switch 24 and the ground return 28. A high resistance voltmeter, such as an electrostatic, electronic, or vacuum tube voltmeter, which may be of the type illustrated in Figure 2, is indicated generally at 31. It is connected by means of leads 32 and 33 to measure the potential across the electrodes of the condenser 23, and is provided with a dial 34. The deflection of the pointer on the dial 34 is dependent only upon the potential across the leads 32 and 33, but the dial is preferably graduated to read time intervals or shutter speeds. It is, of course, also possible to read volts or equivalent units, and to convert this reading to time units. An index 34' indicating unit deflection is marked on the dial 34.

It is desirable to use a voltmeter which will yield a full scale deflection on the dial 34 for the maximum voltage developed between the electrodes of the condenser 23 when the shutter is operated during the testing step, this voltage being preferably between 0.2 volt and 4.0 volts. The meter should, preferably, yield such a full scale deflection while drawing a current of not over about $10^{-10}$, and, desirably, less than $10^{-12}$ amperes, thereby promoting the accuracy of the measurement and making the reading of the dial easier by reducing the drift of the pointer. According to one embodiment the current drawn by the voltmeter is equal to the dark current of the phototube. The invention is not, however, restricted to the use of a voltmeter which draws only such a minute current, because useful, although sometimes not quite as accurate results, can be obtained when voltmeters drawing larger currents are employed. Moreover, the use of voltmeters drawing larger currents can be made possible by employing larger condensers and a more powerful phototube, in conjunction with a light of greater intensity, so as to deal with a larger charge on the condenser.

The anode voltage, i. e., the voltage applied across the electrodes of the phototube 20, should be within the range of voltages within which the anode current is not appreciably affected by variations in the anode voltage, but depends almost entirely upon the intensity of the light acting on the phototube. This range of voltages will depend upon the characteristics of the particular phototube employed. With many tubes, such as type 917 manufactured by the R. C. A. Radiotron Mfg. Co., which was found to be suitable, the range is from about 35 volts to above 200 volts. It is preferred to maintain a direct current potential across the terminals 27—29 which is at least slightly above the lower limit of said range to prevent the anode voltage from dropping to below the lower limit of the range when the condenser 23 becomes charged.

With a type 917 tube the following electrical constants were found to give excellent results: Voltage across the terminals 27—29 was 50 volts; the resistance element 30 has a resistance of 0.400 megohm; the voltmeter 31 drew a current about equal to the dark current of the tube, i. e., a current of the order of 10–12 amperes, and gave a full scale deflection when the potential between the leads 32 and 33 was 0.9 volt; and the condenser 23 had a capacitance depending upon the range of time intervals to be measured, e. g., 0.005 microfarad when the maximum time interval was 1/500 of a second, and 5.0 microfarads when the maximum time interval was 2.0 seconds. It is to be understood that while I have described various units to describe one embodiment of the apparatus which was found to be successful in operation, any equivalent electrical devices may be substituted therefor, and that the values assigned to the various units are merely for illustrating purposes and not for the purpose of limiting the scope of the invention.

The method of operating the device is as follows:

(a) *Adjustment.*—With the device set up in relation to the camera as shown in Figure 1, the iris diaphragm or aperture adjusting device on the camera is set for the aperture at which the camera is to be tested, and the shutter is fixed in its open position by setting it for time exposure. When a vacuum tube voltmeter of the type shown in Figure 2 is used, it is desirable to have the power to the system turned on for five minutes before making the adjustment to warm up the vacuum tubes and obtain a steady operation. The lamp 16 being turned on, a steady beam of light acts on the phototube; the latter translates the received light energy into electrical energy, establishing a current through the resistance element 30, and a corresponding potential between the leads 32 and 33, which causes a deflection of the voltmeter indicating means. The intensity of the light is then adjusted until the voltmeter indicates a unit deflection at the index 34'. This "unit deflection" is, in the embodiment shown in Figures 1 and 2, the full scale deflection, but it may be some other fraction of full scale, such as half scale, as in the dial illustrated in Figure 6. The intensity of the light may be adjusted in any desired manner, as by means of the rheostat 19, and/or by the diaphragm in the optical element 17, and/or by moving the light box 15 away from the camera or nearer to it. It may be stated that the iris diaphragm 12 of the camera itself may in certain cases be used to adjust the light intensity, although this method is not preferred because it prevents the testing of the shutter for different settings of its aperture. The shutter 13 is then closed, causing the voltmeter to indicate zero deflection, in consequence of the resistance element 30 which shunts the terminals of the voltmeter.

(b) *Testing.*—The push button switch 24 is depressed, thereby disconnecting the resistance element 30 from the circuit. The camera shutter is then operated in its usual manner at any desired speed (which must yield an exposure time which does not exceed the maximum time interval which can be indicated on the scale with the particular resistance and condenser employed). The voltmeter will then indicate directly the exposure time or the shutter speed, which is usually expressed as the reciprocal of the time in seconds. Due to the fact that a small, but finite, quantity of electricity usually flows from the condenser by leakage and by flow to the voltmeter, the position of the indicator on the voltmeter will, in most cases drop gradually, unless the dark current of the phototube exactly balances the loss of charge from the condenser. In certain cases in which the dark current exceeds the loss of charge the indicator will rise gradually after the exposure. It is, therefore, evident that the initial reading on the dial 34 is indicative of the speed of the shutter. The gradual drift of the indicator is, however, sufficiently slow in the device described to permit the reading to be made with sufficient accuracy for the purpose intended. After the dial has been read the switch 24 is released, thereby discharging the condenser.

Although in the preferred operation the shutter is operated only once during the testing step, it is possible to operate the shutter several times in rapid succession, and to obtain the desired result by dividing the time interval or by multiplying the "speed" (depending upon the manner in which the dial is graduated) by the number of times the shutter was operated.

The test may then be repeated for different aperture openings, it being necessary to adjust the intensity of the light whenever the aperture is changed. The intensity of the light need not, however, be readjusted when the shutter is operated at a different speed.

It is evident from the foregoing description that the timing device is not dependent for its operation upon the provision of a source of light of known intensity or upon the provision of a known potential for establishing the anode voltage on the phototube, but that the device and method provide for the simple adjustment of the light to the desired intensity. The principle involved in the adjustment of the light and in the testing to obtain a direct reading of the time or speed will be apparent from the following considerations:

When the intensity of the light is adjusted to cause the voltmeter to indicate a unit deflection, the total luminous flux acting upon the cell is J and the intensity of the current passed through the phototube is I. The potential drop across the resistance element 30 which is then measured by the voltmeter and causes the unit deflection is V, which has a value:

$$V = IR \qquad (1)$$

where R is the resistance of the element 30. R being constant, and V, the potential necessary to yield unit deflection being likewise constant, or substantially constant, it is seen that the current I can be established by the adjustment described above.

When, in the testing step, the shutter 13 is entirely closed but switch 24 has not yet been opened, both sides of the condenser 23 are grounded and the condenser has a zero charge and, hence, a zero potential across its electrodes. When the switch 24 is opened in the course of the test, luminous flux of magnitude $j$ (varying from time to time but never exceeding $J$) acts upon the phototube, causing a current $i$, proportional to $j$ (and never exceeding the value $I$) to pass through the phototube; this current causes a quantity of electricity $Q$ to be accumulated on the condenser during the shutter operation. If $t$ represents time, the total charge $Q$ following the operation of the shutter is:

$$Q = \int_0^T i\, dt \tag{2}$$

where $T$ is the total time from the instant that the shutter begins to pass light to the instant that it completely cuts off light. The average open time $T_a$, as defined earlier in this specification, may be expressed by the equation:

$$JT_a = \int_0^T j\, dt \tag{3}$$

Since the phototube has the characteristic of passing a current $i$ which is closely proportional to $j$, the luminous flux transmitted by the shutter, the following proportions exist:

$$i:j::I:J \tag{4}$$

Combining Equations 2, 3 and 4:

$$T_a = \frac{Q}{I} \tag{5}$$

The magnitude of the charge $Q$ is proportional to the potential $V'$ between the electrodes of the condenser in accordance with the equation:

$$V' = \frac{Q}{C} \tag{6}$$

where $C$ is the capacitance of the condenser 23. It therefore follows that the average open time is given by the equation:

$$T_a = \frac{V'C}{I} \tag{7}$$

In other words, the average open time is directly proportional to the potential across the condenser at the completion of the testing step, the proportionality constant being the ratio of $C$ to $I$.

The independence of the proportionality constant in Equation 7 from the anode voltage is apparent from the following expression, obtained by combining Equations 1 and 7:

$$T_a = RC\frac{V'}{V} \tag{8}$$

From Equation 8 it will be seen that the average open time $T_a$ is equal to the product of the resistance $R$, the capacitance $C$, and the ratio of the voltage $V'$ between the electrodes at the completion of the test step to the voltage $V$ required to produce unit deflection in the adjusting step. The first two factors are constants. In mass-length-time units, the product $RC$ has the dimension of time. The ratio of $V'$ to $V$ is proportional to the measured time interval. Since the ratio of $V'$ to $V$ does not vary appreciably when the operating conditions for the voltmeter are slightly different from standard, it will be noted that the adjustment step corrects also for non-standard conditions in the voltmeter. Thus, when a vacuum tube voltmeter is used changes in the filament or plate voltages in the voltmeter circuit may result in a unit deflection on the dial when the applied potential is not exactly $V$; however, this non-standard condition will also affect the deflection of the indicator when $V'$ is measured, in such a way that only a negligible error in the ratio of $V'$ to $V$ will result. Hence the circuit and method according to this invention do not depend upon the existence of standard conditions for the voltmeter on all occasions; it is sufficient that the conditions be the same at the time that the adjustment of the light intensity is effected and at the time that the testing step is carried out. It is, of course, preferable to maintain reasonably constant conditions in the voltmeter circuit.

The complete circuit for one form of voltmeter which has been found to be successful, and a modification of the timing condenser to permit several ranges of time intervals to be measured by the instrument, are shown in Figure 2, from which the optical and mechanical elements, other than the phototube, have been omitted, it being understood that these may be of the type previously described for Figure 1, or of the type subsequently described for Figures 4 and 5, or of any suitable type. Referring to Figure 2, the anode of the phototube 20 is connected to one terminal of normally closed push button switch 24 via lead 25, the other terminal of the switch being connected to the resistance element 30, having a resistance of 0.400 megohm. The other end of the resistance is connected to the common ground return 28, maintained at zero potential as described hereafter. The cathode of the phototube is maintained at a direct current negative potential of 50 volts, as described hereafter.

A plurality of timing condensers of different capacitances are connected so as to be selectively shunted between the lead 25 and the ground return 28 by means of a multi-position switch 35. In the specific embodiment described, the capacitances are as follows: Condenser 23a, 0.005 microfarad; condenser 23b, 0.05 microfarad; condenser 23c, 0.5 microfarad; and condenser 23d, 5.0 microfarads.

The voltmeter circuit comprises two electron emissive devices 36 and 37 which may be any suitable well known types, for example type 38 pentodes as shown; a filament heating supply circuit comprising a resistor 38 of 5 ohms to reduce the filament voltage below the normal 6.3 volts provided by the secondary winding 39 of a transformer having a primary winding 40 and a control switch 41; a galvanometer having a dial 34 connected between the anodes of the vacuum tubes 36 and 37 by leads 42 and 43; a pair of matched resistors 47 and 48, each of 1,000 ohms resistance, connected to the leads 42 and 43, respectively, and interconnected by a 600 ohm potentiometer 46, the adjustable tap of which is connected to the plate supply source described hereafter and maintained at a positive potential of 25 volts with respect to the ground; a pair of matched resistors 37 and 48, each of 1,000 ohms resistance, connected to the cathodes of the vacuum tubes 36 and 37, and directly interconnected; and a resistor 49 of 50,000 ohms connected between the juncture of the resistance elements 47 and 48 and a source of negative potential which, in the embodiment shown, is the same as that supplying negative potential to the cathode of the phototube. The voltage measured by the voltmeter is impressed upon the grids of the vacuum tubes by leads 32 and 33 connected to the anode of the phototube and to the ground return, respectively. The remaining electrical elements in this figure merely provide the stabilized direct current potentials.

The power supply circuit is designed to supply a stabilized current at a potential of 75 volts across the terminals of the resistor 50 of 22,500 ohms, having a tap at 50b which is connected to ground. The tap 50b is located so that when the potential of the tap is assigned the value of zero, the end 50a has a potential of 50 volts negative and the end 50c has a potential of 25 volts positive. The terminals of the resistor 50 are connected to a gas-filled voltage regulator 51, such as VR–105, through a resistor 51' of 7,500 ohms. Direct current is supplied to the terminals of the voltage regulator through a resistor 52 of 9,000 ohms, and choke coil 54 having an inductance of 12 henries from a full wave rectifier tube 56, such as type 80, drawing current from the secondary winding 58 of the transformer. The filament of the rectifier tube 56 is heated by an auxiliary secondary winding 57. Condensers 53 and 55 are connected at the terminals of the choke coil as shown; they may be of the electrolytic type and have capacitances of 8 microfarads.

The galvanometer may be of the d'Arsonval moving coil type, having any desired scale. When the dial is to be graduated in reciprocals of the time intervals it is desirable to use an instrument having specially shaped pole pieces so as to give a substantially linear reciprocal scale, for example, $1/5$ at full scale, $1/30$ at half scale, and $1/50$ at one tenth scale.

Figure 6:
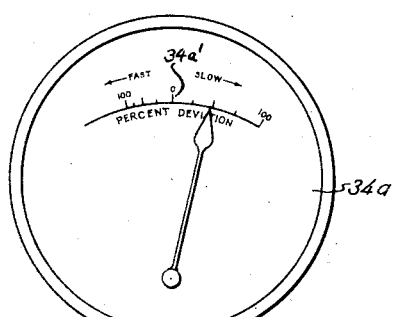
Figure 6 is a plan view of a modified dial graduated to show deviations from a standard speed.

In the device illustrated in Figure 2 the unit deflection referred to in the adjustment step is at full scale, although any other part of the scale may be selected for unit deflection, as shown hereafter in Figure 6. Regardless of what point on the dial is selected for unit deflection, the graduations are as follows: When the switch 35 is set to connect the condenser 23a to the circuit, the reading at the point selected for unit deflection is $1/500$ of a second, shorter time intervals (i. e., faster shutter speeds) being marked off for lesser deflections proportional to the voltage required to produce the respective deflection. Readings for the other condensers 23b, 23c and 23d, at the point selected for unit deflection are $1/50$, $1/5$, and 2 seconds, respectively. It is, of course, not necessary to inscribe four different sets of numbers on the dial, since the operator can obtain the proper reading by applying the proper decimal factor to the reading depending upon the position of the switch 35.

The circuit according to Figure 2 is used in the manner described for Figure 1, i. e., the light intensity is adjusted to obtain unit deflection with the camera shutter fully open (the position of the switch 35 being immaterial in this step), the switch 35 is positioned in accordance with the shutter speed to be measured, and the test step is then carried out by depressing the push button 24 and reading the speed on the dial 34. When other speeds are to be tested with the same aperture it is not necessary to repeat the adjustment of the light intensity, it being only necessary to change the position of the switch 35 to select the desired range.

It will be seen that I have provided a voltmeter circuit which is exceedingly stable. The potentials applied to the vacuum tubes are somewhat below the rated values for the purpose of adding stability to the circuit. This fact makes it advisable to provide a five minute warming up period before using the instrument.

It is also possible to provide for different ranges of time intervals by providing several resistors 30 instead of several timing condensers. This method is not always as convenient as the preferred embodiment described for Figure 2, but is useful under some conditions. Such a circuit has been illustrated in Figure 3, wherein the anode of the phototube 20 is shown to be connected to the timing condenser 23 by lead 25, the condenser being further connected to the ground terminal 29, as in Figure 1. Similarly, the cathode is connected to the negative terminal 27 by lead 26, and the electrodes of the condenser are connected to the voltmeter 31 having the dial 34 via leads 32 and 33. The circuit differs from the previous circuit in that a multi-position switch 24a is provided to connect any one of a plurality of resistors 30a, 30b, 30c and 30d to the circuit through the normally closed push button switch 24. In this embodiment a particular resistor must be selected prior to the adjustment step, and the intensity of the light is then adjusted as described heretofore. The operation is otherwise the same, it being understood that the dial 34 will indicate different ranges of time intervals corresponding to the several resistors. When a different range of time intervals is to be measured the position of the switch 24a is changed and the intensity of the light must be readjusted.

With some forms of cameras it is not practical to remove the back to direct the beam of light through the shutter. It is, however, usually possible to insert a mirrored surface in the space provided for the film. A modification of the optical system suitable for cameras of this type is shown in Figures 4 and 5.

Referring to these figures, 60 is a camera having an optical unit 61 comprising the usual lens and aperture device. The shutter is indicated at 62 as being a vertically moving curtain of the type used in focal plane shutters. A reflecting surface 63, which may suitably be a thin metallic mirror or a film having a surface treated to reflect light, is placed in the camera in the space usually occupied by the light sensitive surface. Light is directed into the camera through a tubular light shield 64 which is contiguous to the front of the camera. The shield is provided with a transverse partition wall 65 which is preferably parallel to the direction of travel of the focal plane shutter, i. e., at right angles to the slot in the curtain 62, the slot being not shown in the drawing. In the embodiment illustrated in Figures 4 and 5, wherein the curtain 62 is vertically movable, the wall 65 is likewise vertical. The plane of the wall 65 should preferably bisect the slot in the curtain 62. Light is emitted from the light box 15, which may be of the type previously described for Figure 1, located to one side of the shield so as to direct a beam of light against reflecting prism 66. The deflected beam then passes through the optical unit 61 into the camera, is reflected from the surface 63, and returns on the other side of the wall 65 to act on the phototube 20. Leads 25 and 26 connect the electrodes of the phototube to a suitable voltmeter circuit, such as the circuits of Figures 1, 2 and 3.

It will be understood that the relation between the optical unit of the light box and the angular position of the prism 66 must be such that the beam of light will be directed to the phototube 20. Auxiliary lenses may be provided in the shield 64, these being well understood in the art and are not, therefore, described in detail.

Figure 4:
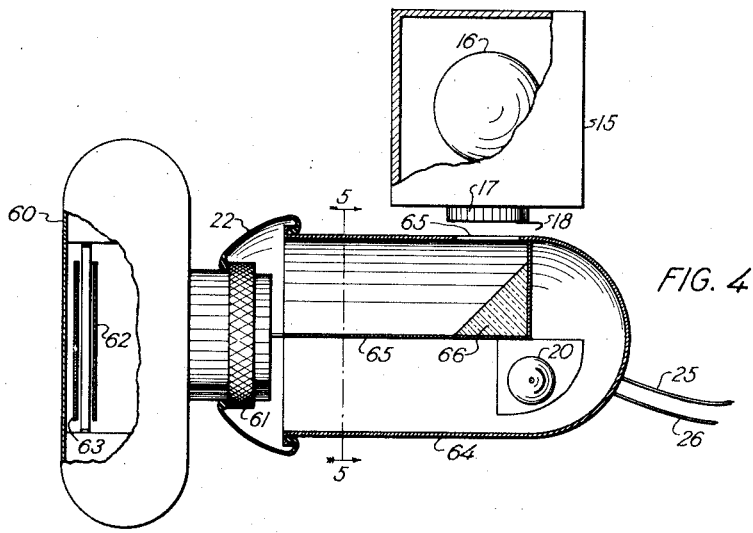
Figure 4 is a plan view, partly in section, of the mechanical and optical elements of the device applied to a different type of photographic camera.
Figure 5:
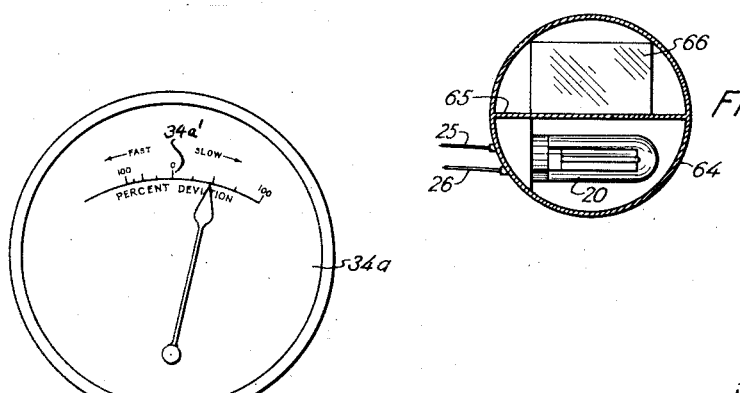
Figure 5 is a sectional view taken on line 5—5 of Figure 4.

A particular advantage of the arrangement in Figures 4 and 5 is that it permits the speed of the shutter to be measured for several points along its course of travel. Thus it is known that such shutters accelerate during the exposure, and that all parts of the light sensitive surface are not given the same exposure time. Instead of providing a reflecting surface 63 which extends over the entire frame of the surface on which a picture would be photographed, the reflecting surface may be masked so as to leave only a relatively narrow strip of reflecting surface covering the portion of the frame which is to be tested for shutter speed. This strip would extend across the camera, but be relatively narrow in the direction of the travel of the shutter. Instead of using masks it is, of course, possible to use surfaces having only narrow strips of reflecting areas. It is possible in this manner to test the shutter speed at various points along the course of travel of the shutter. It is, of course, necessary to re-adjust the intensity of the light beam each time a different mirror or a different mask is used. Of course when the back of a camera having a focal plane shutter can be removed these cameras can be tested by the method described heretofore for the between the lens shutter using the device shown in Figure 1, including either testing for average open time for the entire frame or for instantaneous speeds at different points along the travel of the shutter. A suitable mask, or a narrow beam of light focussed at the shutter plane and passing through the point at which the instantaneous speed is to be determined may be used with the optical arrangement of Figure 1.

The prism and mirror arrangement of Figures 4 and 5 may, of course, also be used to test cameras having a between the lens shutter.

It may further be desirable to take precautions against having light reflected from the lens of the camera, since this light may, in the arrangement of Figures 4 and 5, act on the phototube even though the shutter is closed. This reflection may be remedied by designing the partition wall 65 to extend near to the lens and by applying a suitable anti-reflection composition to the lenses; or by removing the lens from the camera.

Figure 3:
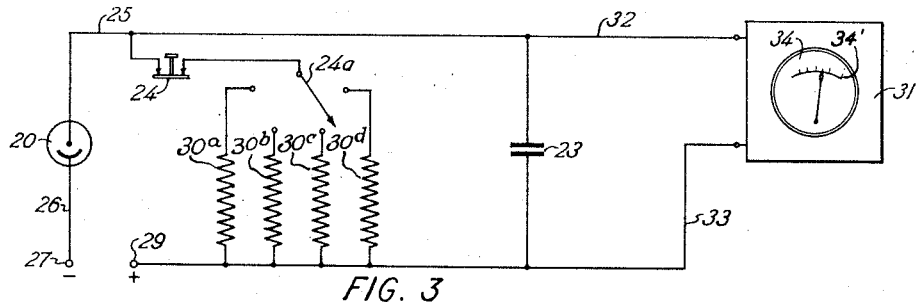
Figure 3 is a wiring diagram of a modified circuit.

In Figure 6 is illustrated a modified form of the dial which permits a single set of graduations to be used with any one of the plurality of timing condensers in Figure 2 or with any one of the plurality of resistors of Figure 3. It may be used in any of the circuits previously described.

In the dial 34a in Figure 6 the unit deflection is taken at approximately the midpoint of the dial and is marked by index 34a' "0." The scale is then graduated in percent deviations of shutter speeds (these being reciprocals of time intervals). Thus, for a point on the scale corresponding to a voltage twice that required for unit deflection, the marking will be slow 100% because if this voltage were measured in the testing step the shutter would have exposed the phototube twice as long would have been required for unit deflection, and the speed of the shutter is said to be slow 100%. Similarly, for a point on the scale corresponding to a voltage say one half of that required for unit deflection, the marking will be fast 100%, because if this voltage were measured in the testing step the shutter would have exposed the phototube half as long as necessary to produce unit deflection, and the speed of the shutter is said to be fast 100%. Other points on the scale are similarly graduated. It will be noted that the scale is non-linear unless, of course, a galvanometer having specially shaped pole pieces, designed to make the scale linear, is employed.

It will be obvious to those skilled in the use of electric circuits of this type that various details therein may be varied without departing from the spirit of the invention. Having fully described the prefered embodiment of the invention and several variants thereof, I wish to point out that it is not limited to the specific arrangement shown but is of the scope of the appended claims.

What I claim and wish to protect by Letters Patent of the United States is:

1. A device for measuring a short time interval during which a mechanical element which normally prevents the passage of light is disposed to transmit light, comprising a light source arranged to direct light of adjustable intensity toward said mechanical element, photo-sensitive means adapted to receive said light when the mechanical element is disposed to transmit light and to translate the light into an electrical current, an electrical resistance connected to receive the current output of the photosensitive means, means for disconnecting the electrical resistance, a timing condenser connected to accumulate the output of the photo-sensitive means when the electrical resistance is disconnected, a high resistance voltmeter connected to measure the potential across said resistance when said current is flowing through said electrical resistance, and to measure the potential across the timing condenser due to the accumulated charge when the electrical resistance is disconnected, and an indicating means responsive to potentials measured by said voltmeter, said indicating means being provided with an index, whereby the intensity of the light can be adjusted to bring the potential across the electrical resistance to a predetermined value when the mechanical element is fixed to transmit light continuously, said indicating means being adapted to indicate the measured time interval when the said potential across the timing condenser is measured.

2. The device according to claim 1 in which the electrical resistance in its connected condition is in shunt with the timing condenser, whereby the condenser will be discharged through the electrical resistance when no light acts on the photo-sensitive means.

3. The device according to claim 1 in which the resistance of the timing condenser and the resistance of the voltmeter are such that the current flowing from the timing condenser after it has been charged is substantially equal to the dark current of the photo-sensitive means.

4. The device according to claim 1 which comprises a plurality of timing condensers of different capacitances and means for selectively connecting said condensers to receive the output of the photo-sensitive means, whereby a plurality of ranges of time intervals can be indicated on the indicating means.

5. The device according to claim 1, which comprises a plurality of electrical resistances of different resistances and means for selectively connecting said electrical resistances to receive the current output of the photo-sensitive means, whereby the intensity of the light can be adjusted to a plurality of different values for indicating a corresponding plurality of ranges of time intervals on the indicating means.

6. A device for measuring the average open time of a camera shutter comprising a light source arranged to illuminate the shutter with light of adjustable intensity, a phototube adapted to receive the light when the shutter is open and to translate the light into an electrical current, a timing condenser connected in the output circuit of the phototube, an electrical resistance normally shunted across said timing condenser, means for disconnecting the electrical resistance, whereby the current output of the phototube will flow through the electrical resistance when it is connected, the timing condenser will be discharged through the resistance when no current is flowing from the phototube and the electrical resistance is connected, and the output of the phototube will be accumulated in the timing condenser when the electrical resistance is disconnected, a high resistance voltmeter connected to measure the potential across the timing condenser, and an indicating means responsive to potentials measured by said voltmeter, said indicating means being provided with an index, whereby the intensity of the light can be adjusted to bring the potential across the electrical resistance to a predetermined value when the shutter is fixed in its open position and the electrical resistance is connected, said indicating means being adapted to indicate the measured average open time when the shutter is operated with the electrical resistance disconnected.

7. The device according to claim 6 in which the voltmeter is a vacuum tube voltmeter comprising two electron emissive vacuum tubes and the indicating means comprises a galvanometer connected to the anodes of the vacuum tubes.

8. The device according to claim 6 which comprises a reflecting surface positioned on one side of the camera shutter and in which the light source and phototube are both positioned on the other side of the camera shutter and arranged to cause only light reflected from said reflecting surface to act on the phototube.

9. The method of measuring the period of a relatively short current flow from a source, which comprises causing current to flow continuously from said source, passing said current flow through a resistance to develop a voltage drop therein, measuring said voltage drop on a predetermined fixed scale, adjusting said source to bring said voltage drop to a predetermined scale value, accumulating the current flow from the adjusted source during the period of the short current flow to be measured, developing a voltage from said accumulated current, and measuring said latter voltage on said predetermined scale.

10. The method of operating a circuit for measuring energy emanating from a constant source over a short time interval which comprises developing a voltage representing the continuous emanation value of said source, measuring said voltage in terms of a predetermined scale, adjusting the output of said source to provide a predetermined reading on said scale, accumulating energy from the adjusted source emitted over said short time interval, developing a voltage from said accumulated energy, and measuring said latter voltage in terms of said predetermined scale.

11. The method of measuring the period of a relatively short operation of a shutter positioned between a light source and a photo-electric tube which comprises opening said shutter to permit the light from said source to fall on said photo-electric tube, developing a voltage proportional to the output of said photo-electric tube, measuring said voltage in terms of a predetermined scale, adjusting the strength of said light source to give a predetermined reading on said scale, closing said shutter, opening said shutter for the short interval to be measured with said light source at adjusted value, accumulating the output of said photo-electric tube during said short interval, developing a voltage from said accumulated output, and measuring said latter voltage on said predetermined scale.

CARL JOSEPH PENTHER.